United States Patent
Du et al.

(10) Patent No.: US 9,020,438 B2
(45) Date of Patent: Apr. 28, 2015

(54) DATA TRANSMISSION METHOD AND SYSTEM

(71) Applicant: Huawei Technologies Co., Ltd., Shenzhen, Guangdong (CN)

(72) Inventors: Yinggang Du, Shenzhen (CN); Sheng Liu, Shenzhen (CN); Rui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/624,369

(22) Filed: Sep. 21, 2012

(65) Prior Publication Data

US 2013/0023276 A1    Jan. 24, 2013

Related U.S. Application Data

(63) Continuation of application No. PCT/CN2011/074180, filed on May 17, 2011.

(30) Foreign Application Priority Data

Sep. 21, 2010  (CN) .......................... 2010 1 0292515

(51) Int. Cl.
*H04W 72/04* (2009.01)
*H04B 7/02* (2006.01)
(Continued)

(52) U.S. Cl.
CPC .............. *H04B 7/024* (2013.01); *H04W 16/32* (2013.01); *H04W 72/1289* (2013.01); *H04W 72/1226* (2013.01)

(58) Field of Classification Search
USPC .......................... 455/25, 63.4, 443, 444, 448, 455/456.1–456.7
See application file for complete search history.

(56) References Cited

U.S. PATENT DOCUMENTS 6,212,405 B1 *  4/2001  Jiang et al. .................... 455/561
6,751,444 B1 *  6/2004  Meiyappan ..................... 455/69
(Continued)

FOREIGN PATENT DOCUMENTS

CN    1248831 A    3/2000
CN    1248875 A    3/2000
(Continued)

OTHER PUBLICATIONS

Written Opinion of the International Searching Authority dated Aug. 25, 2011 in connection with International Patent Application No. PCT/CN2011/074180.
(Continued)

*Primary Examiner* — Vladimir Magloire
*Assistant Examiner* — Erica Navar

(57) ABSTRACT

The present invention provides a data transmission method and system, where the method is used in a system architecture adopting a virtual heterogeneous network, where a macro base station covering a macro-cell and a pico base station covering a pico-cell share the same station address. The method includes the following step: sending control information and data information to user terminals in the macro-cell and the pico-cell according to location information of the user terminals so that the user terminals obtain the data information according to the control information. The system includes a sending module. The present invention implements joint scheduling of resources between a macro base station and a pico base station, reduces interference between cells, and maximally improves an overall data rate.

5 Claims, 3 Drawing Sheets

(51) Int. Cl.
*H04W 16/32* (2009.01)
*H04W 72/12* (2009.01)

(56) References Cited

U.S. PATENT DOCUMENTS

| | | | |
|---|---|---|---|
| 7,526,036 B2 | 4/2009 | Mehta et al. | |
| 2008/0057933 A1* | 3/2008 | Brunner | 455/422.1 |

FOREIGN PATENT DOCUMENTS

| | | |
|---|---|---|
| CN | 1984428 A | 6/2007 |
| CN | 101420725 A | 4/2009 |
| CN | 101599785 A | 12/2009 |
| EP | 0 984 650 A2 | 3/2000 |
| WO | WO 2010/059518 A1 | 5/2010 |
| WO | WO 2010/076773 A2 | 7/2010 |

OTHER PUBLICATIONS

"Techniques to Cope with High Interference in Heterogeneous Networks", Qualcomm Incorporated, 3GPP TSG-RAN WG1 #59bis, Jan. 18-22, 2009, 5 pages.

Supplementary European Search Report dated Mar. 18, 2013 in connection with European Patent Application No. EP 11 77 7197.

"Coordinated Multi-Point downlink transmission in LTE-Advanced", Qualcomm Europe, 3GPP TSG-RAN WG1 #55, Nov. 10-15, 2008, 6 pages.

"Performance Evaluation for Type II Relay", Alcatel-Lucent Shanghai Bell, Alcatel-Lucent, 3GPP TSG RAN WG1 Meeting #59bis, Jan. 18-22, 2010, 5 pages.

"DL Type 2 Relay/Macro HetNet Performance: Adaptive FFR", Alcatel-Lucent, Alcatel-Lucent Shanghai Bell, Feb. 22-26, 2010, 4 pages.

"DL Carrier Aggregation Performance in Heterogeneous Networks", Qualcomm Europe, 3GPP TSG RAN WG1 #58, Aug. 24-28, 2009, 10 pages.

"Interference Conditions in Heterogeneous Networks", Qualcomm Incorporated, 3GPP TSG-RAN WG1 #59bis, Jan. 18-22, 2010, 10 pages.

"Analysis on the eICIC schemes for the control channels in HetNet", Huawei, 3GPP TSG RAN WG1 meeting #61bis, Jun. 28-Jul. 2, 2010, 7 pages.

International Search Report dated Aug. 25, 2011 in connection with International Patent Application No. PCT/CN2011/074180.

Partial translation of Office Action dated Jul. 30, 2013 in connection with Chinese Patent Application No. 201010292515.5.

* cited by examiner

DATA TRANSMISSION METHOD AND SYSTEM

CROSS-REFERENCE TO RELATED APPLICATIONS

This application is a continuation of International Application No. PCT/CN2011/074180, filed on May 17, 2011, which claims priority to Chinese Patent Application No. 201010292515.5, filed on Sep. 21, 2010, both of which are hereby incorporated by reference in their entireties.

TECHNICAL FIELD

The present invention relates to the communications field, and in particular, to a data transmission method and system.

BACKGROUND

With the popularity of radio communications technologies and mobile phones, base stations are seen everywhere in cities and countryside. Base stations are generally categorized into macro base stations and pico base stations according to the distance between base stations. An area covered by a macro base station is called a macro-cell (Macro-cell) and an area covered by a pico base station is called a pico-cell (Pico-cell). For contiguous coverage, adjacent base stations may cover the cell edge of adjacent cells, and equivalent-power interference exists at the cell edge of the adjacent cells. In this case, call quality and data rates of user terminals in the edge area may be affected. According to a traditional method, interference performance is generally improved passively by using interference suppression, frequency orthogonalization, soft frequency multiplexing, or by adding a mobile phone smart antenna. Concerning an issue on effectively using the power of adjacent base stations, coordinated transmission between adjacent base stations is being more and more focused in the academic field and industry field.

In the current Third Generation Partnership Project (3rd Generation Partnership Project, 3GPP for short) standards, a heterogeneous network (Heterogeneous Network, HetNet for short) uses macro-cells to achieve contiguous and seamless coverage of an area, and uses pico-cell overlapped coverage at hot points. The pico-cells are directed to a large number of service traffic demands at the hot points, providing a high capacity to implement "distribution on demand" for system capacity.

However, in the prior art, because of limitations of backhaul (Backhaul) capability and synchronization requirements, each base station is not capable of implementing real-time joint transmission to achieve resource scheduling and interference management. Consequently, enhancement of the system capacity is limited.

SUMMARY

Embodiments of the present invention provide a data transmission method and system, for overcoming the defect that enhancement of the system capacity is limited due to a failure in joint processing between base stations in the prior art, implementing joint scheduling of resources between a macro base station and a pico base station, mitigating interference between cells, and maximally improving an overall data rate.

An embodiment of the present invention provides a data transmission method for use in system architecture adopting a virtual heterogeneous network, where a macro base station covering a macro-cell and a pico base station covering a pico-cell share the same station address, and the method includes the following step:

sending control information and data information to user terminals in the macro-cell and the pico-cell according to location information of the user terminals so that the user terminals obtain the data information according to the control information.

An embodiment of the present invention provides a data transmission system that is used in system architecture adopting a virtual heterogeneous network, where a macro base station covering a macro-cell and a pico base station covering a pico-cell share the same station address, and the system includes:

a sending module, configured to send control information and data information to user terminals in the macro-cell and the pico-cell according to location information of the user terminals so that the user terminals obtain the data information according to the control information.

According to the data transmission method and system in the embodiments of the present invention, the pico base station and the macro base station are set to share the same station address, and the macro base station and the pico base station schedule the user terminals in a centralized manner, and send the control information and the data information to the user terminals in the macro-cell and the pico-cell according to the location information of the user terminals so that the macro base station and the pico base station implement joint transmission of the information of the user terminals. This implements joint scheduling of the communication resources of the user terminals between the macro base station and the pico base station, overcomes the defect that enhancement of the system capacity is limited due to a failure in joint processing between base stations in the prior art, and beaks through limitations of the backhaul capability and synchronization requirements. In this way, interference between cells is mitigated and the overall data rate is improved maximally.

BRIEF DESCRIPTION OF THE DRAWINGS

To make the technical solutions in the embodiments of the present invention or in the prior art clearer, the accompanying drawings for illustrating the embodiments of the present invention or the prior art are briefly described below. Apparently, the accompanying drawings are for the exemplary purpose, and persons skilled in the art may derive other drawings from such accompanying drawings without creative efforts.

DETAILED DESCRIPTION

In order to make the objectives, technical solutions, and advantages of the present invention more comprehensible, the technical solutions according to embodiments of the present invention are clearly and described in the following with reference to the accompanying drawings. Apparently, the embodiments in the following description are merely a part rather than all of the embodiments of the present invention. All other embodiments obtained by persons skilled in the art based on the embodiments of the present invention without creative efforts shall fall within the protection scope of the present invention.

Figure 1:
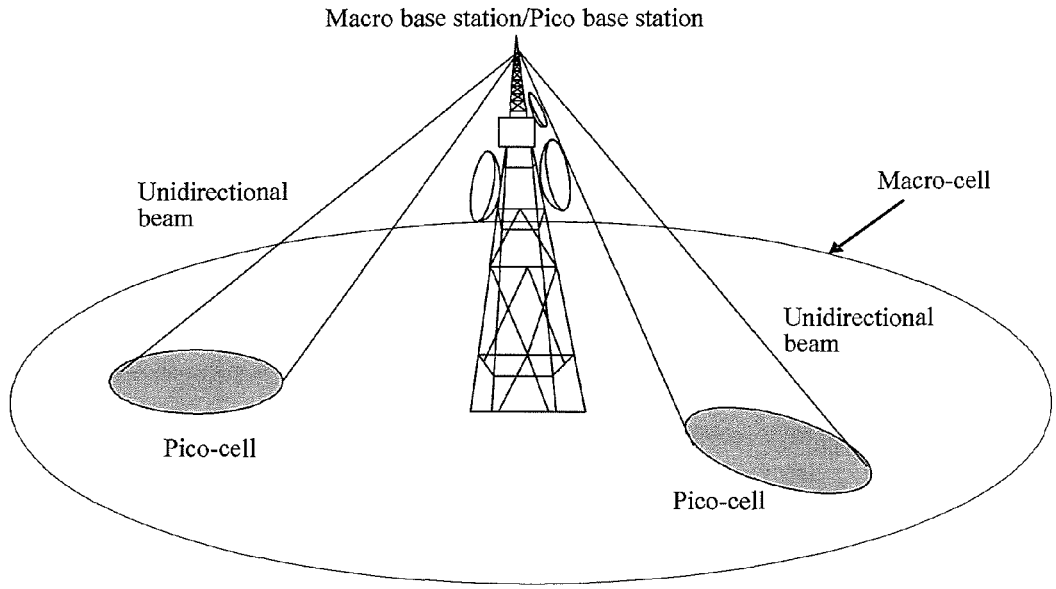
FIG. 1 is a schematic structural diagram of a system of V-HetNet according to embodiment one of the present invention.

An embodiment of the present invention provides a data transmission method. The method may specifically use system architecture having a virtual heterogeneous network (Virtual HetNet, V-HetNet for short). FIG. 1 is a schematic structural diagram of a system of V-HetNet according to embodiment one of the present invention. As shown in FIG. 1, the system may include a macro base station, a pico base station, a macro-cell, and a pico-cell. The macro-cell is a cell covered by the macro base station, and the pico-cell is a cell covered by the pico base station. In this embodiment, the macro base station and the pico base station share the same station address. The same station address refers to the case where an antenna group is added at the station address of the macro base station, the antenna group and an original macro base station are interconnected through optical fibers, and the antenna group covers the pico cell by using beamforming to implement functions of the pico base station. Therefore, in this embodiment, the base station and the pico base station may share a baseband system therebetween, implementing sharing of the channel information and the data information therebetween. In addition, in the common area covered by the macro base station and the pico base station, that is, user terminals in the pico-cell, the macro base station and the pico base station may concurrently reach each of the user terminals in the area. Therefore, the macro base station may implement scheduling in a centralized manner.

The method provided in this embodiment of the present invention includes the following step: sending, by a base station, control information and data information to user terminals in the macro-cell and pico-cell according to location information of the user terminals so that the user terminals obtain the data information according to the control information. The location information of the user terminals in this embodiment is specific locations of the user terminals in the macro-cell or the pico-cell, and may be the locations of the user terminals in the macro-cell relative to the pico-cell or the locations of the user terminals in the pico-cell relative to the macro-cell. In this embodiment, the macro base station and the pico base station share the same station address. The macro base station and the pico base station may schedule the user terminals in the macro-cell and the pico-cell in a centralized manner. During scheduling of the user terminals, the scheduling is specifically performed according to the locations of the user terminals, that is, the control information and the data information are sent to the user terminals according to the location information of the user terminals. After receiving the control information sent by the base station, the user terminals may specifically obtain their corresponding data information according to the control information.

In this embodiment, the macro base station and the pico base station share the same station address; and therefore the macro base station may achieve strict synchronization with the pico base station so that signals sent by the macro base station and the pico base station arrive at the user terminals synchronously. In this way, the interference between control channels or between data channels during the process of sending the control information or the data information to the pico-cell and the macro-cell is prevented.

This embodiment provides a data transmission method. According to the method, the pico base station and the macro base station are set to share the same station address, and the macro base station and the pico base station schedule the user terminals in a centralized manner, and send the control information and the data information to the user terminals in the macro-cell and the pico-cell according to the location information of the user terminals so that the macro base station and the pico base station implement joint transmission of the information of the user terminals. This implements joint scheduling of the communication resources of the user terminals between the macro base station and the pico base station, overcomes the defect that enhancement of the system capacity is limited due to a failure in joint processing between base stations in the prior art, and beaks through limitations of the backhaul capability and synchronization requirements. In this way, interference between cells is mitigated and the overall data rate is improved maximally.

Figure 2:
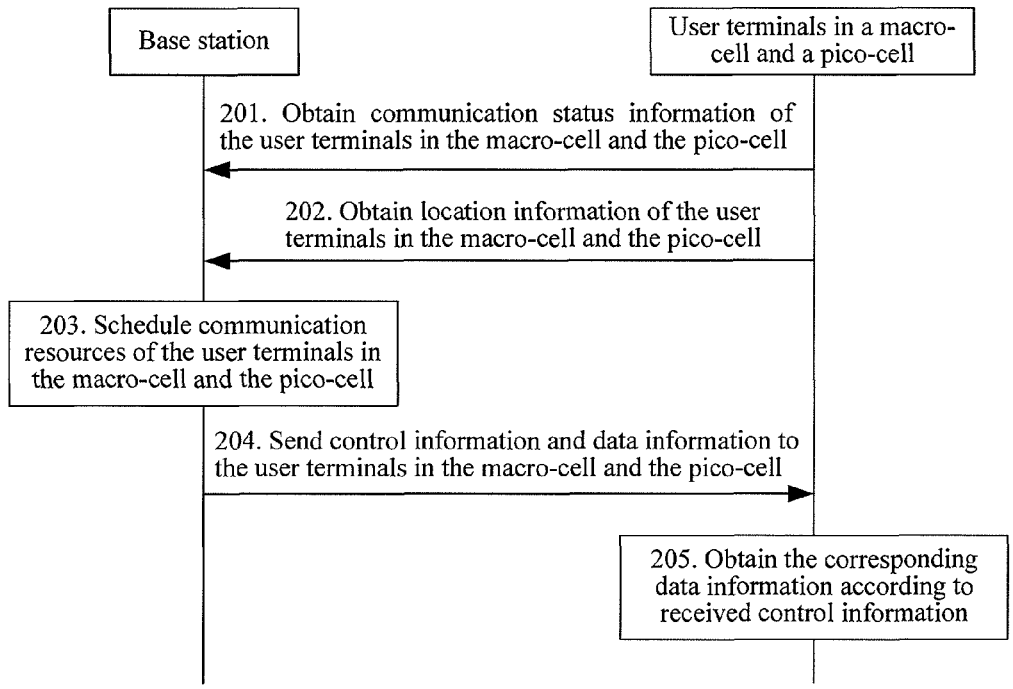
FIG. 2 is a flowchart of a data transmission method according to embodiment two of the present invention.

FIG. 2 is a flowchart of a data transmission method according to embodiment two of the present invention. As shown in FIG. 2, this embodiment provides a data transmission method, which specifically uses system architecture of a V-HetNet, and a macro base station and a pico base station share the same station address. The data transmission method provided in this embodiment may specifically include the following steps:

Step 201: A base station obtains communication status information of user terminals in a macro-cell and a pico-cell, where the base station in this step is specifically a macro base station.

Before data transmission, when a user needs to call, by using his own user terminal, the user terminal of another user, or send a short message to or received a shot message from another user terminal or conduct any other communication services, the user terminal firstly sends a service request to a corresponding base station. Specifically, a user terminal in a macro-cell sends a service request to a macro base station, and a user terminal in a pico-cell sends a service request to a pico base station, where the service request carries the communication status information of a corresponding user terminal. The communication status information may be specifically related information indicating the current communication status of the user terminal. For example, the communication status information may include information of another terminal that the user terminal desires to call or send a short message to. In this embodiment, the pico base station and the macro base station share the same station address; and therefore, the macro base station may obtain the communication status information of the pico base station by using an optical fiber connected to the pico base station and the communication status information of the user terminals in the macro cell may be directly received by the macro base station.

Step 202: The base station obtains location information of the user terminals in the macro-cell and the pico-cell, where the base station is a macro base station.

Figure 3:
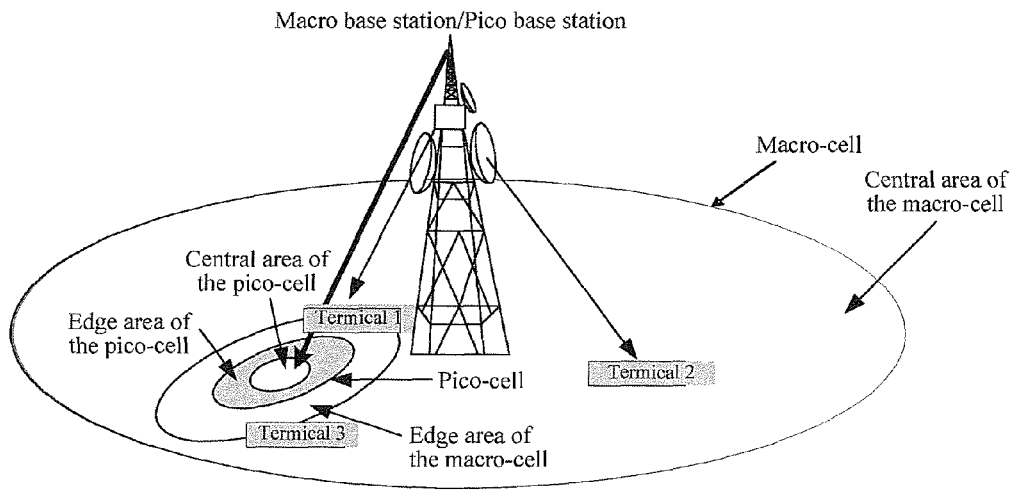
FIG. 3 is a schematic structural diagram of a system of V-HetNet according to embodiment two of the present invention.

Besides the communication status information of the user terminals in the macro-cell and the pico-cell, the macro base station also obtains the location information of the user terminals in the macro-cell and the pico-cell. FIG. 3 is a schematic structural diagram of a system of V-HetNet according to embodiment two of the present invention. As shown in FIG. 3, in this embodiment, specifically the coverage area of the pico base station is divided into two parts, the central area of the pico-cell and the edge area of the pico-cell. Correspondingly, the coverage area of the macro base station is also divided into two parts, the central area of the macro-cell and the edge area of the macro-cell. The edge area and the central area of the macro-cell are relative to the pico-cell. To be specific, the edge area of the macro-cell is an area around the boundary between the macro-cell and the pico-cell, and the remaining area of the macro-cell is relatively the central area. Specifically, the boundary between the central area and the edge area of the pico-cell may be dynamically adjusted by the macro base station according to a load of the macro-cell and/or the pico-cell. When the number of user terminals in the pico-cell is large, the boundary may be set a little inwards, that is, a smaller central area is setting; if the number of user terminals in the pico-cell is small, the boundary may be set a little outwards, that is, a larger central area is set to cover more user terminals. The specific number of user terminals may also be set according to actual requirements. The area covered by the macro base station includes both the macro-cell and the pico-cell. Therefore, the macro base station may obtain the specific location information of the user terminals in the macro-cell and the pico-cell. Specifically, the location information may be obtained by using the user terminals to report the information to the base station. The location information may be that a user terminal is located in the central area or the edge area of the macro-cell, or that a user terminal is located in the central area or the edge area of the pico-cell.

Step 203: The base station schedules the communication resources of the user terminals in the macro-cell and the pico-cell in a centralized manner according to the communication status information. The base station is a macro base station.

After receiving the communication status information of each of the user terminals, the macro base station refers to the communication status information of different user terminals to schedule communication resources of the user terminals in the pico-cell and the macro-cell in a centralized manner. The communication resources may include bandwidth information, subcarrier information, and modulation information that are used for data transmission. In this embodiment, the macro base station centralizes the communication resources of the user terminals in the macro-cell and the pico-cell to manage and schedule the communication resources uniformly, allocate the communication resources uniformly, and negotiate a transmission manner uniformly, and so on. During scheduling, the macro base station may specifically allocate different communication resources for different user terminals according to different communication status information corresponding to different user terminals, and generate a corresponding scheduling result. If a user terminal desires to conduct a complex communication service, more communication resources may be allocated to the user terminal; if a user terminal desires to conduct a simple communication service, fewer communication resources may be allocated to the user terminal.

Step 204: The base station sends control information and data information to the user terminals in the macro-cell and the pico-cell according to the location information of the user terminals and a scheduling result, where the base station is a macro base station and/or a pico base station.

In this step, during transmission of the control information, specifically the macro base station may send the control information to the user terminals in the macro-cell and the pico-cell uniformly according to the location information of the user terminals and the scheduling result. The macro base station may specifically use a frequency division manner to send the control information. To be specific, the user terminals in the macro-cell and the user terminals in the pico-cell occupy a part of spectrums respectively. Here the case where the user terminals in the macro-cell occupy a first transmission spectrum and the user terminals in the pico-cell occupy a second transmission spectrum is used as an example for description, where the first transmission spectrum and the second transmission spectrum are orthogonal. That is, no overlapped spectrum exists between the first transmission spectrum and the second transmission spectrum. It should be noted that the first transmission spectrum and the second transmission spectrum may be respectively a spectrum range. That is, multiple user terminals in the macro-cell, or the pico-cell may occupy one transmission frequency for data transmission, or multiple user terminals may occupy multiple transmission frequencies for data transmission. In this step, specifically the macro base station uses the first transmission spectrum to send corresponding control information to the user terminals in the macro-cell; and uses the second transmission spectrum to send corresponding control information to the user terminals in the pico-cell, so that to the orthogonality of the communication resources occupied by the user terminals in the pico-cell and the macro-cell. In this embodiment, the control information of the user terminals in the macro-cell and the pico-cell is negotiated and sent by the macro base station. This ensures that the control information may arrive at the user terminals in the macro-cell and the pico-cell synchronously. In addition, the coverage range of the pico base station falls within the coverage range of the macro base station, so that the user terminals in the pico-cell may receive the control information of the macro base station, the interference between control channels in the pico-cell and the macro-cell is prevented. It should be noted that, the data transmission method provided in this embodiment may be specifically applicable to a scenario where the number of pico-cells is small (for example, one to three pico-cells). When the number of pico-cells is large, the transmission manner where the pico base station schedules the control information of the pico-cell in the prior art may be used, which is not detailed here.

In addition, in this embodiment, to prevent the control information of the user terminals in the pico-cell from being mistakenly received by the user terminals in the macro-cell, a control channel of the pico-cell needs to be processed as required. For example, a cell sequence number of the pico-cell may be used to scramble the control information carried on the control channel of the pico-cell so as to differentiate from the control information carried on a control channel of the macro-cell. Alternatively, centralized numbering processing may be performed for all the user terminals in the macro-cell. The user terminals in the pico-cell are also located within the coverage range of the macro-cell. Therefore, the user terminals in the macro-cell and the pico-cell are numbered in a centralized manner. In this case, the user terminals in both the macro-cell and the pico-cell have a unique number, so that the macro base station or the pico base station, during user terminal scheduling, may be free of mistaken reception due to the same number of the user terminals in different cells. In this way, the probability of mistaken reception may be greatly reduced, and no scrambling processing is required.

In this step, during transmission of the data information, according to this embodiment, the macro base station and the pico base station may send the data information to the user terminals in the macro-cell and the pico-cell according to the location information of the user terminals. Specifically, in this step, if the user terminals in the pico-cell are located in the central area of the pico-cell, or the user terminals in the macro-cell are located in the central area of the macro-cell, the macro base station and the pico base station use the same transmission resource to respectively send the data information of the user terminals in the macro-cell and the user terminals in the pico-cell. To be specific, the macro base station directly uses the transmission resource that is the same as the transmission resource of the user terminals in the macro-cell to send the data information of the user terminals in the pico-cell. Specifically, the macro base station and the pico base station may use the same transmission frequency to respectively send the data information of the user terminals in the macro-cell and the pico-cell. When the user terminals are located in the central area of the pico-cell, the beam intensity of the pico-cell greatly differs from that in the macro-cell, and the user terminals in the pico-cell may directly take a signal sent by the macro-cell as noise. Therefore, the data information may be sent by scheduling beams of the pico-cell itself. In terms of both time and frequency, this part of transmission resources of the user terminals in the pico-cell may overlap the transmission resources of the macro-cell. When the user terminals are located in the central area of the macro-cell, the user terminals in the macro-cell may also directly take a signal sent by the pico-cell as noise. Therefore, the data information may be sent by scheduling beams of the macro-cell. In terms of both time and frequency, this part of transmission resources of the user terminals in the macro-cell may overlap the transmission resources of the pico-cell. Therefore, in this embodiment, the macro base station uses the same transmission resource to respectively send the data information of the user terminals in the macro-cell and the pico-cell. A scenario this step is directed to may be that the macro base station and the pico base station use the same transmission resource to send the data information of the user terminals in the macro-cell and the user terminals in the pico-cell if the user terminals in the pico-cell are located in the central area of the pico-cell and the user terminals in the macro-cell are located in the central area of the macro-cell, or if the user terminals in the pico-cell are located in the central area of the pico-cell and the user terminals in the macro-cell are located in the edge area of the macro-cell, or if the user terminals in the pico-cell are located in the edge area of the pico-cell and the user terminals in the macro-cell are located in the central area of the macro-cell.

In this step, during transmission of the data information, if the user terminals in the pico-cell are located in the edge area of the pico-cell and the user terminals in the macro-cell are located in the edge area of the macro-cell, the user terminals in the pico-cell are close to the user terminals in the macro-cell. In this case, as regards both the user terminals in the macro-cell and the user terminals in the pico-cell, the macro base station and the pico base station perform joint pre-coding on the data carried on the data channels of the user terminals in the macro-cell and/or the pico-cell based on the same codebook by using the antenna group of the macro-cell and the antenna group of the pico-cell and then send the data. In this step, the macro base station and the pico base station schedule the antenna group of the macro-cell and the antenna group of the pico-cell in a centralized manner, and use the same codebook to perform joint pre-coding on the data carried on the data channels of the user terminals and then send the data. In this embodiment, the macro base station and the pico base station may achieve centralized scheduling of data transmission of the user terminals according to a specific scheduling policy. Specifically, the joint data transmission solution provided in this embodiment may be a multi-user terminal multiple input multiple output (Multiple Input Multiple Output, MIMO for short) solution where the data of the user terminals in the macro-cell and the data of the user terminals in the pico-cell are transmitted concurrently, or may be a single-user terminal MIMO solution where the data of the user terminals in the macro-cell or the data of the user terminals in the pico-cell is transmitted concurrently, or may be a multi-user terminal MIMO solution where the data of the user terminals in the macro-cell or data of the user terminals in the pico-cell is transmitted concurrently. To be specific, the data of multiple user terminals in the macro-cell and the pico-cell may be transmitted concurrently, or the data of a single user terminal in the macro-cell or the pico-cell may be transmitted concurrently, or the data of multiple user terminals in the macro-cell or the pico-cell may be transmitted concurrently.

In the above steps according to this embodiment, the process of jointly pre-coding the data information of the user terminals in the macro-cell and/or the pico-cell by using the same codebook and then sending the data by using the antenna group of the macro-cell and the antenna group of the pico-cell may include the following steps: first, the macro base station or the pico base station uses the same codebook to pre-code the data carried on the data channels of the user terminals in the macro-cell and/or the pico-cell to generate a coded data stream, where the dimension of the coded data stream is equal to the maximum number of data streams that the codebook includes. In this embodiment, assume that the antenna group of the macro base station is formed of M antennas, and the antenna group of the pico base station is formed of N antennas. The antenna group of the macro base station is far from the antenna group of the pico base station. Therefore, the antenna groups may be considered to be independent of each other. To be specific, there are M+N antennas in total, where M and N are all positive integers. According to the characteristics of beamforming, it is hard to form multiple beams in a specific smaller area by using an antenna array element group. Therefore, in the pico-cell, a single beam is generally used to send data, increasing data throughput by using a high signal to noise ratio and a high modulation manner. In this embodiment, according to the specification in a protocol, assume that the maximum number of data streams that a codebook is capable of storing is T, where T is a positive integer and smaller than or equal to M+N, and assume that the number of data streams to be transmitted on the data channels of the user terminals is L, where L is a positive integer and smaller than or equal to T.

Figure 4:
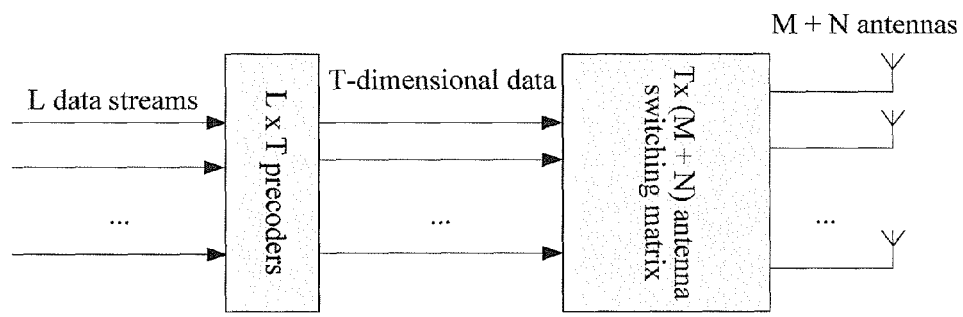
FIG. 4 is a schematic flowchart of data pre-coding and data sending according to embodiment two of the present invention.

FIG. 4 is a schematic flowchart of data pre-coding and data sending according to embodiment two of the present invention. As shown in FIG. 4, in this embodiment, the same codebook may be used to pre-code the data to be transmitted and carried on the data channels of the user terminals in the macro-cell and/or the pico-cell. Specifically, the macro base station or the pico base station may pre-code L data streams to be transmitted by using an L×T pre-coding matrix to generate T-dimensional coded data streams. In addition, the macro base station or the pico base station map the coded data streams to antennas in the antenna groups of the macro-cell and the pico-cell by using an antenna switching matrix, and sending the coded data streams. After pre-coding the data streams to be transmitted, the macro base station or the pico base station maps the coded data streams, which are after T-dimensional pre-coding, to the M+N antennas according to the antenna switching matrix, that is, a matrix T×(M+N), and uses the M+N antennas to send the coded data streams. The antenna switching matrix T×(M+N) is obtained by extracting T columns from an (M+N)-dimensional DFT matrix. When T=M+N, the antenna switching matrix is a T-dimensional unit matrix. In this embodiment, the macro base station or the pico base station combines the antennas of the macro-cell and the pico-cell, and integrates transmission capabilities to send the data of a single user terminal or multiple user terminals by using the entire resources of the macro-cell and the pico-cell.

Further, in this embodiment, uplink transmission of data is similar to downlink transmission of data. The macro base station may also combine the equivalent beams of the pico-cell with the antennas of the macro-cell to perform joint decoding on received data streams. In addition, the macro base station and the pico base station are directly connected through optical fibers. Therefore, no latency exists between the macro base station and the pico base station, and the macro base station is capable of effectively receiving the data sent by the user terminals in the macro-cell and the user terminals in the pico-cell, and differentiating different cells according to information such as a cell number.

In this step, if the user terminals in the pico-cell are located in the edge area of the pico-cell, the data information is sent to the user terminals in the macro-cell and the pico-cell respectively by using orthogonal transmission beams to prevent interference between the user terminals in the macro-cell and the user terminals the pico-cell. To be specific, in this embodiment, if jointly transmitting the data of the user terminals, the macro base station may also schedule the user terminals in the macro-cell according to the location information of the user terminals in the pico-cell, and send the data information of scheduled user terminals. During transmission of the data information, the data information is sent to the user terminals in the macro-cell by using the transmission beams orthogonal to the beams used in sending the data information to the user terminals in the pico-cell. Because the location of the pico-cell is relatively fixed, if scheduling the user terminals in the macro-cell, the macro base station may perform beam negotiation according to the location of the pico-cell and avoid scheduling the user terminals in the direction of the pico-cell as much as possible.

Still referring to FIG. 3, a terminal 1 is located in the edge area of the pico-cell, when scheduling the user terminals in the macro-cell, that is, sending data information to the user terminals in the macro-cell, the macro base station may try to select a transmission beam orthogonal to the transmission beam corresponding to the terminal 1, that is, trying to choose to schedule a terminal 2 in the figure, instead of a terminal 3 in the figure in case that the terminal 1 in the pico-cell is interfered.

Further, in this embodiment, when performing multi-user transmission, the macro base station may directly enable the user terminals in the pico-cell to occupy a single one-dimensional space. If two pico-cells exist and these two pico-cells are close to each other, a slide lode may cause interference to adjacent pico-cells. In this case, the macro base station may schedule these two pico-cells in a centralized manner. One method is to disable one of the pico-cells firstly and send data separately in terms of time or frequency.

It should be noted that if there are more than one pico-cell in the macro-cell, the joint transmission process in this embodiment may be performed by only one of the pico-cells together with the macro-cell. This is because after the joint transmission manner, including the pre-coding manner and resource block information, between the macro-cell and a pico-cell is determined, the probability of the joint transmission with another pico-cell is close to zero; however, the probability of beam negotiation with another pico-cell still exists.

Step 205: The user terminals obtain their corresponding data information according to received control information.

When the user terminals in the macro-cell or the pico-cell receive the control information sent by the base station, sub-carrier information and channel information and so on, which are indicated by the control information, are obtained by parsing the control information. This step is common knowledge for those skilled in the art, and therefore is not detailed here.

This embodiment provides a data transmission method. According to the method, the pico base station and the macro base station are set to share the same station address, and the macro base station and the pico base station schedule the user terminals in a centralized manner, and send the control information and the data information to the user terminals in the macro-cell and the pico-cell according to the location information of the user terminals so that the macro base station and the pico base station implement joint transmission of the information of the user terminals. This implements joint scheduling of the communication resources of the user terminals between the macro base station and the pico base station, overcomes the defect that enhancement of the system capacity is limited due to a failure in joint processing between base stations in the prior art, and beaks through limitations of the backhaul capability and synchronization requirements. In this way, interference between cells is mitigated and the overall data rate is improved maximally.

Persons skilled in the art may understand that all or part of steps according to the embodiments of the present invention may be implemented by a program instructing relevant hardware. The programs may be stored in a computer readable storage medium. When the programs are executed, the steps of the methods in the embodiments are executed. The storage medium includes any medium capable of storing program codes, such as a ROM, a RAM, a magnetic disk, or a CD-ROM.

An embodiment provides a data transmission system capable of performing the steps described in method embodiment one, which is not detailed here again. The data transmission system provided in this embodiment may be used in system architecture adopting a virtual heterogeneous network, where a macro base station covering a macro-cell and a pico base station covering a pico-cell share the same station address. The data transmission system provided in this embodiment may specifically include a sending module. The sending module is configured to send control information and data information to user terminals in the macro-cell and the pico-cell according to location information of the user terminals so that the user terminals obtain the data information according to the control information.

Figure 5:
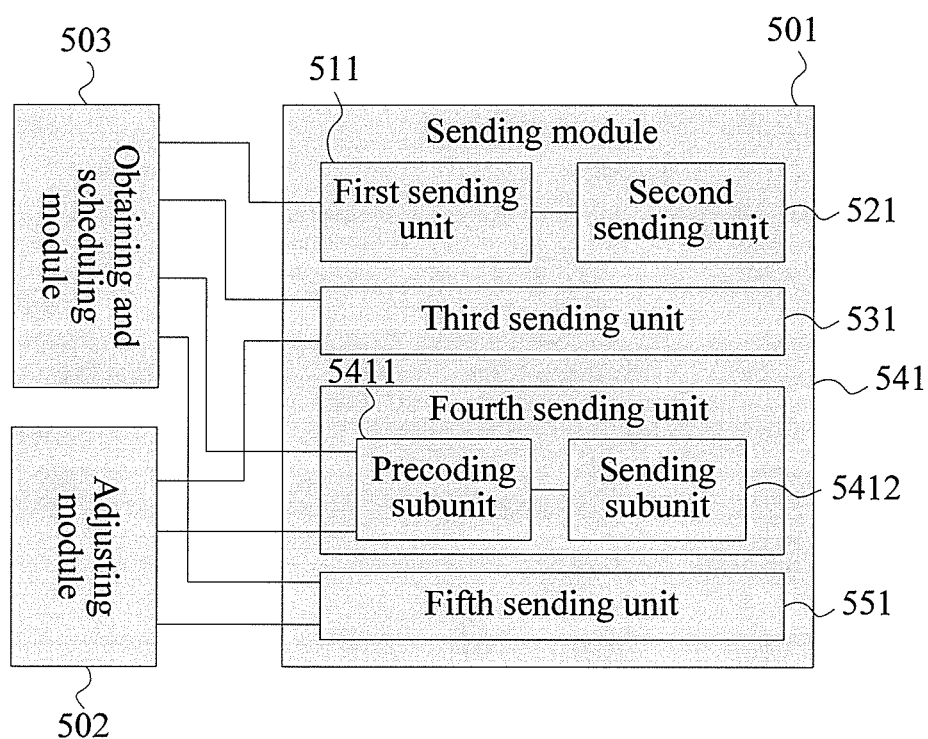
FIG. 5 is a schematic structural diagram of a data transmission system according to an embodiment of the present invention.

FIG. 5 is a schematic structural diagram of a data transmission system according to an embodiment of the present invention. As shown in FIG. 5, this embodiment provides a data transmission system capable of performing the steps described in method embodiment two, which is not detailed here again. In the data transmission system provided in this embodiment, the sending module 501 may specifically include a first sending module 511 and a second sending module 521. The first sending unit 511 is configured to send corresponding control information to user terminals in a macro-cell by using a first transmission spectrum. The second sending unit 521 is configured to send corresponding control information to user terminals in a pico-cell by using a second transmission spectrum. The first transmission spectrum and the second transmission spectrum are orthogonal.

Specifically, the sending module 501 in the data transmission system provided in this embodiment may further include a third sending unit 531. The third sending unit 531 is configured to: if the user terminals in the pico-cell are located in the central area of the pico-cell or the user terminals in the macro-cell are located in the central area of the macro-cell, send data information of the user terminals in the macro-cell and the user terminals in the pico-cell by using the same transmission resource.

Further, the sending module 501 in the data transmission system provided in this embodiment may further include a fourth sending unit 541. The fourth sending unit 541 is configured to: if the user terminals in the pico-cell are located in the edge area of the pico-cell and the user terminals in the macro-cell are located in the edge area of the macro-cell, jointly pre-code and send data information of the user terminals in the macro-cell and/or the pico-cell based on the same codebook by using an antenna group of the macro-cell and an antenna group of the pico-cell.

Further, the fourth sending unit 541 in the data transmission system provided in this embodiment may include a pre-coding subunit 5411 and a sending subunit 5412. The pre-coding subunit 5411 is configured to pre-code the data information of the user terminals in the macro-cell and/or the pico-cell by using the same codebook to generate a coded data stream, where the dimension of the coded data stream is equal to the maximum number of data streams that the codebook includes. The sending subunit 5412 is configured to map the coded data stream to antennas in the antenna groups of the macro-cell and the pico-cell by using an antenna switching matrix, and sending the coded data stream.

Further, the sending module 501 in the data transmission system provided in this embodiment may further include a fifth sending unit 551. The fifth sending unit 551 is configured to: if the user terminals in the pico-cell are located in the edge area of the pico-cell, send the data information to the user terminals in the macro-cell and the pico-cell respectively by using orthogonal transmission beams.

Further, the data transmission system provided in this embodiment may further include an adjusting module 502. The adjusting module 502 is configured to adjust the boundary between the central area and the edge area of the pico-cell according to a load condition in the macro-cell and/or the pico-cell. For the detailed adjustment method, reference may be made to the related steps in the method embodiments, which is not detailed here.

Further, the data transmission system provided in this embodiment may further include an obtaining and scheduling module 503. The obtaining and scheduling module 503 is configured to obtain communication status information of the user terminals in the macro-cell and the pico-cell to schedule communication resources of the user terminals in a centralized manner according to the communication status information.

This embodiment provides a data transmission system. According to the system, the pico base station and the macro base station are set to share the same station address, and the macro base station and the pico base station schedule the user terminals in a centralized manner, and send the control information and the data information to the user terminals in the macro-cell and the pico-cell according to the location information of the user terminals so that the macro base station and the pico base station implement joint transmission of the information of the user terminals. This implements joint scheduling of the communication resources of the user terminals between the macro base station and the pico base station, overcomes the defect that enhancement of the system capacity is limited due to a failure in joint processing between base stations in the prior art, and beaks through limitations of the backhaul capability and synchronization requirements. In this way, interference between cells is mitigated and the overall data rate is improved maximally.

Finally, it should be noted that the above embodiments are merely provided for describing the technical solutions of the present invention, but not intended to limit the present invention. It should be understood by persons skilled in the art that although the present invention has been described in detail with reference to the embodiments, modifications may be made to the technical solutions described in the embodiments, or equivalent replacements may be made to some technical features in the technical solutions, as long as such modifications or replacements do not cause the essence of corresponding technical solutions to depart from the spirit and scope of the present invention.

What is claimed is:

1. A data transmission method for use in a system architecture adopting a virtual heterogeneous network, wherein a macro base station covering a macro-cell and a pico base station covering a pico-cell share a same station address, and the method comprises:
    sending control information and data information to user terminals in the macro-cell and the pico-cell according to location information of the user terminals, so that the user terminals obtain the data information according to the control information; and
    wherein sending data information to user terminals in the macro-cell and the pico-cell according to location information of the user terminals comprises:
        if the user terminals in the pico-cell are located in an edge area of the pico-cell and the user terminals in the macro-cell are located in an edge area of the macro-cell, jointly pre-coding and sending data information of the user terminals in the macro-cell and the pico-cell based on a same codebook by using an antenna group of the macro-cell and an antenna group of the pico-cell.

2. The method according to claim 1, wherein jointly pre-coding and sending data information of the user terminals in the macro-cell and the pico-cell based on a same codebook by using an antenna group of the macro-cell and an antenna group of the pico-cell comprises:
    pre-coding, by using the same codebook, the data information of the user terminals in the macro-cell and the pico-cell to generate a coded data stream, wherein a dimension of the coded data stream is equal to a maximum number of data streams that the codebook comprises; and
    mapping the coded data stream to antennas in the antenna group of the macro-cell and the pico-cell by using an antenna switching matrix in order to send the data stream.

3. A data transmission system for use in a system architecture adopting a virtual heterogeneous network, wherein a macro base station covering a macro-cell and a pico base station covering a pico-cell share a same station address, and the data transmission system comprises:
    a sending module, configured to send control information and data information to user terminals in the macro-cell and the pico-cell according to location information of the user terminals so that the user terminals obtain the data information according to the control information; and
    wherein the sending module comprises:
        a fourth sending unit, configured to: if the user terminals in the pico-cell are located in an edge area of the pico-cell and the user terminals in the macro-cell are located in an edge area of the macro-cell; jointly pre-code and send data information of the user terminals in the macro-cell and the pico-cell based on a same codebook by using an antenna group of the macro-cell and an antenna group of the pico-cell.

4. The system according to claim 3, wherein the fourth sending unit comprises:
- a pre-coding subunit, configured to pre-code the data information of the user terminals in the macro-cell and the pico-cell by using the same codebook to generate a coded data stream, wherein a dimension of the coded data stream is equal to a maximum number of data streams that the codebook comprises; and
- a sending subunit, configured to map the coded data stream to antennas in the antenna group of the macro-cell and the pico-cell by using an antenna switching matrix in order to the antennas can send the data stream.

5. The system according to claim 3, wherein the sending module comprises:
- a fifth sending unit, configured to: if the user terminals in the pico-cell are located in the edge area of the pico-cell, send the data information to the user terminals in the macro-cell and the pico-cell respectively by using orthogonal transmission beams.

* * * * *